United States Patent
Bailey et al.

(10) Patent No.: US 8,621,237 B1
(45) Date of Patent: Dec. 31, 2013

(54) PROTECTING AGAINST CRYPTOGRAPHIC KEY EXPOSURE IN SOURCE CODE

(75) Inventors: Daniel V. Bailey, Pepperell, MA (US); Aaron Katz, Haverhill, MA (US); Craig R. Paradis, Hudson, MA (US); Robert D. Hopley, Fitchburg, MA (US)

(73) Assignee: EMC Corporation, Hopkinton, MA (US)

( * ) Notice: Subject to any disclaimer, the term of this patent is extended or adjusted under 35 U.S.C. 154(b) by 64 days.

(21) Appl. No.: 13/173,874

(22) Filed: Jun. 30, 2011

(51) Int. Cl.
*G06F 11/30* (2006.01)
*G06F 12/14* (2006.01)
*G06F 11/00* (2006.01)
*G06F 12/16* (2006.01)
*G08B 23/00* (2006.01)

(52) U.S. Cl.
USPC .......................................... 713/189; 726/25

(58) Field of Classification Search
USPC ....................................................... 713/189
See application file for complete search history.

(56) References Cited

U.S. PATENT DOCUMENTS

| | | | |
|---|---|---|---|
| 6,668,325 B1 * | 12/2003 | Collberg et al. | 713/194 |
| 6,839,712 B1 * | 1/2005 | Kumhyr et al. | 717/108 |
| 7,131,000 B2 * | 10/2006 | Bradee | 713/164 |
| 7,584,354 B2 * | 9/2009 | Graunke | 713/167 |
| 7,809,135 B2 * | 10/2010 | Johnson et al. | 380/44 |
| 7,853,924 B2 * | 12/2010 | Curran | 717/110 |
| 7,953,970 B2 * | 5/2011 | Abbott | 713/156 |
| 8,151,117 B2 * | 4/2012 | Hicks | 713/187 |
| 8,290,152 B2 * | 10/2012 | Montgomery et al. | 380/44 |
| 2004/0139370 A1 * | 7/2004 | Bailey et al. | 714/38 |
| 2005/0002532 A1 * | 1/2005 | Zhou et al. | 380/277 |
| 2005/0076220 A1 * | 4/2005 | Zhang et al. | 713/176 |
| 2005/0229156 A1 * | 10/2005 | Baumann | 717/110 |
| 2007/0133593 A1 * | 6/2007 | Shankara | 370/463 |
| 2007/0283158 A1 * | 12/2007 | Danseglio | 713/180 |
| 2011/0167407 A1 * | 7/2011 | Betouin et al. | 717/120 |
| 2012/0042384 A1 * | 2/2012 | Badhwar et al. | 726/25 |
| 2012/0137373 A1 * | 5/2012 | Miseldine | 726/28 |

\* cited by examiner

*Primary Examiner* — Carolyn B Kosowski
*Assistant Examiner* — Jason C Chiang
(74) *Attorney, Agent, or Firm* — BainwoodHuang

(57) ABSTRACT

A technique protects source code and is performed in an electronic device. The technique involves performing, on the source code, a scanning operation which provides a scanning result indicating whether the source code includes a cryptographic key. The technique further involves performing a remedial operation (e.g., alerting an administrator, deleting the key, replacing the key, combinations thereof, etc.) to prevent undesired exposure of the cryptographic key when the scanning result indicates that the source code includes a cryptographic key. The technique further involves refraining from performing the remedial operation when the scanning result indicates that the source code does not include a cryptographic key.

16 Claims, 5 Drawing Sheets

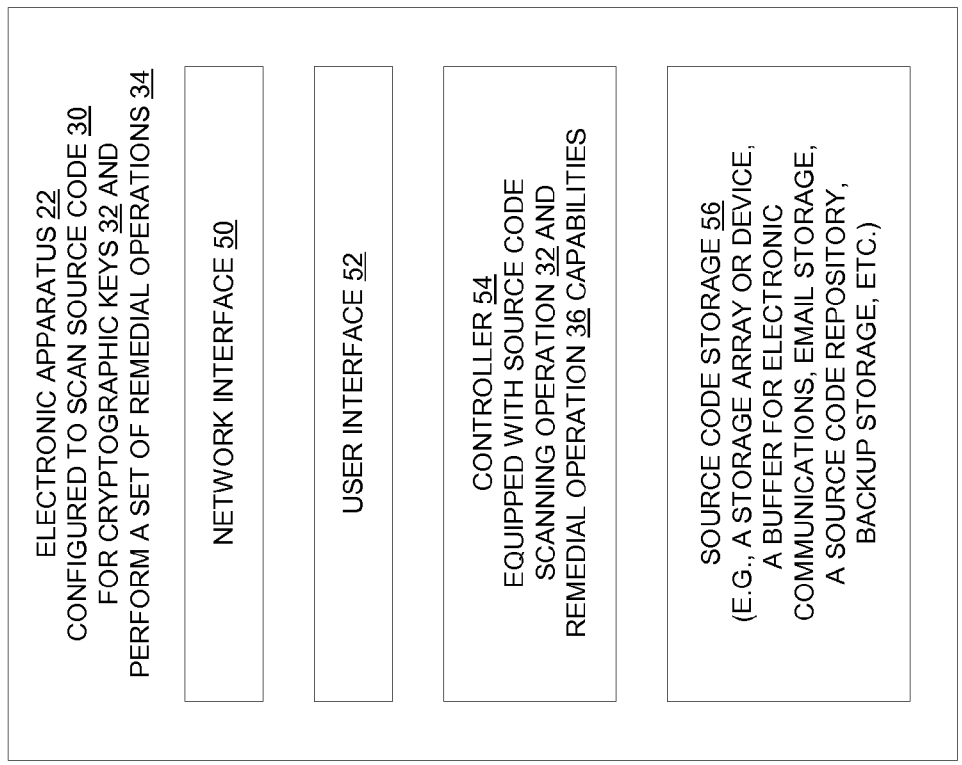
FIG. 2

PROTECTING AGAINST CRYPTOGRAPHIC KEY EXPOSURE IN SOURCE CODE

BACKGROUND

Computer programmers typically write source code in one or more computer programming languages. The programmers then convert the source code into an executable program which is capable of running on a computer.

At times, a running program may require use of a symmetric key or a private key to encrypt or decrypt data. One way to provide such a key is for a programmer to directly write the key into the source code prior to creating the executable program.

To assist a large software development organization in maintaining its source code, the organization may employ software development tools which provide various software development services such as version control, document coordination, and code merging. An example of a conventional software configuration management (SCM) tool is Rational ClearCase which is offered by the Rational Software division of IBM of Armonk, N.Y.

SUMMARY

There are drawbacks to directly writing a symmetric key or a private key into source code. For example, anyone having access to the source code would now have access to the key. In the context of a large software development organization, the number of people with access to the source code and thus the key may in the hundreds.

Additionally, suppose that a computer programmer stores source code having such a key in a laptop, and the laptop is then lost or stolen. At that point, the security provided by the key must be assumed to be compromised.

Furthermore, once the source code having the key is converted into an executable program, the executable program must now be protected. That is, mere possession of the executable program now provides the ability to decrypt data.

Moreover, any backups of the source code and/or the executable program provides an avenue to the key. Accordingly, each backup provides yet another opportunity to compromise security.

Unfortunately, it may be extremely difficult and/or expensive for a large software development organization to sift through lines of source code looking for keys. Along these lines, the organization may be responsible for maintaining millions of lines of source code thus making any manual search of source code for keys an impractical endeavor.

Improved techniques involve protecting source code by scanning the source code for cryptographic keys using an electronic tool. For example, such scanning can be performed in a manner similar to that of a data loss prevention (DLP) tool which filters data for sensitive information such as credit card numbers, social security numbers, and so on. If the results of such scanning uncovers a cryptographic key within the source code, the electronic tool can be configured to automatically take remedial action (e.g., alert an administrator, delete the key, replace the key, combinations thereof, etc.). As a result, further undesired exposure of the key is prevented.

One embodiment is directed to a method of protecting source code which is performed in an electronic device. The method includes performing, on the source code, a scanning operation which provides a scanning result indicating whether the source code includes a cryptographic key. The method further includes performing a remedial operation to prevent undesired exposure of the cryptographic key when the scanning result indicates that the source code includes a cryptographic key. The method further includes refraining from performing the remedial operation when the scanning result indicates that the source code does not include a cryptographic key.

In some arrangements, the source code (i.e., programming language text) belongs to a particular software component of a set of software components (e.g., source files). In these arrangements, the method further includes building a software application (e.g., generating an executable program) from the set of software components after performing the scanning operation. In alternative arrangements, the scanning operation takes place after building the application.

In some arrangements, performing the scanning operation includes discovering a cryptographic sequence of symbols within the source code and performing a watermark detection operation on the cryptographic sequence of symbols. The output of the watermark detection operation may have a first value when the cryptographic sequence of symbols is an actual cryptographic key and a second value when the cryptographic sequence of symbols is a token which has replaced the cryptographic key, where the first value is different from the second value.

Other embodiments are directed to electronic systems (e.g., a software development platform), electronic devices (e.g., a computer, a firewall, an email server, etc.), computer program products, processes, and so on. Some embodiments are directed to various electronic components and circuits which are involved protecting source code.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 2 is a block diagram of an apparatus of the electronic environment of FIG. 1.

DETAILED DESCRIPTION

An improved technique involves protecting source code by scanning the source code for a cryptographic key using an electronic tool. Such scanning can be performed in a manner similar to that of a data loss prevention (DLP) tool which filters data for sensitive information such as credit card numbers, social security numbers, and so on. If the results of such scanning uncovers a cryptographic key within the source code, the electronic tool can be configured to automatically take remedial action (e.g., send an alert message, remove the key, replace the key, and so on). Accordingly, further undesired exposure of the cryptographic key is prevented.

Figure 1:
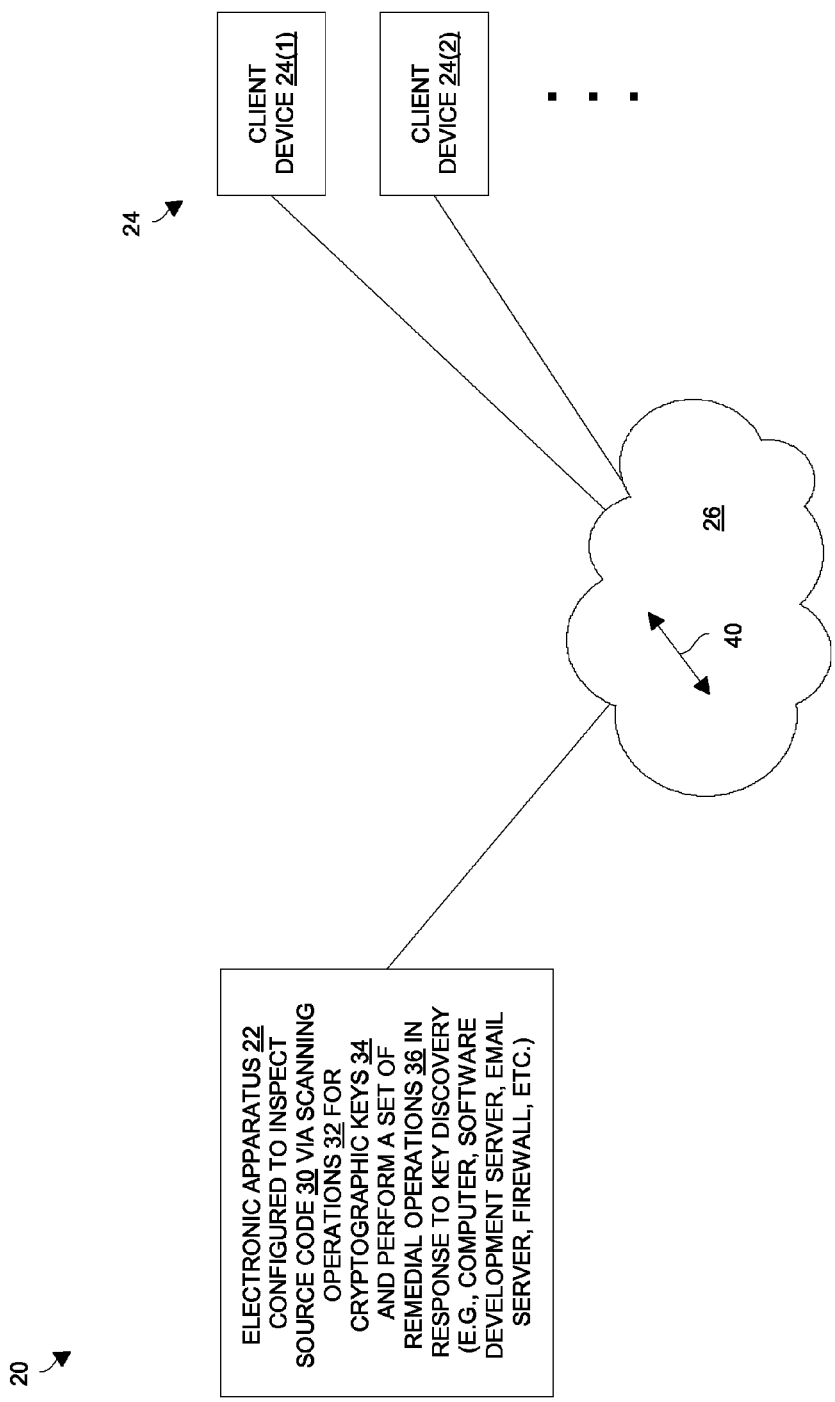
FIG. 1 is a block diagram of an electronic environment which protects source code from undesired cryptographic key exposure.

FIG. 1 shows an electronic environment 20 which protects source code from undesired exposure of cryptographic keys.

The electronic environment 20 includes an electronic apparatus 22 and perhaps additional hardware such as client devices 24(1), 24(2), ... (collectively, client devices 24) and a communications medium 26.

The electronic apparatus 22 is constructed and arranged to receive source code 30, and perform electronic scanning operations 32 on the source code 30 to inspect the source code 30 for the presence of cryptographic keys 34. If the electronic apparatus discovers a cryptographic key 34 in the source code 30, the electronic apparatus perform a set of remedial operations 36 in response to key discovery. A variety of different scanning techniques can be employed by the electronic apparatus 22 to perform such searching. For example, the electronic apparatus 22 may inspect electronic data using an approach similar to that of DLP technology which looks for data having particular formats such as a credit card number format, a social security number format, etc. As another example, the electronic apparatus 22 may search for particular character or symbols strings or for parameters which satisfy a particular mathematical property, and so on. Further details of particular scanning operations 32 will be provided below.

Additionally, it should be understood that the electronic apparatus 22 may take a variety of forms. Examples include a general purpose computer running a specialized program which scans source files within a file system (i.e., source code at rest), a firewall or other data communications device which scans electronic communications containing source code (i.e., source code en route between end point devices), an email server (or email client) which scans email messages containing source code, a software development platform which scans source code being checked into or out of a source code repository, a virtual machine host system which scans virtual machine images containing source code, a backup server which scans data containing source code and/or applications during a backup process, and so on.

The client devices 22 are constructed and arranged to operate on behalf of users. In particular, the client devices 22 enable the users to access source code locally, and concurrently perform work (e.g., create and edit source files, exchange email messages, test software, access the Internet, etc.).

The communications medium 26 connects the various electronic components of the electronic environment 20 together to enable the electronic components to exchange electronic communications 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based devices and cabling, fiber optic devices and cabling, wireless devices, combinations thereof, etc. Moreover, some portions of the communications medium 26 may include a computer network (e.g., the Internet, a LAN, a VPN, etc.) while other portions may include a different type of network (e.g., SAN hardware, etc.).

During operation of the electronic environment 20, the electronic apparatus 22 scans through source code 30 looking for cryptographic keys 34. In some arrangements, such scanning involves searching for a string of characters or symbols having a cryptographic key format. Such a format is typically characterized by a bit sequence having a length which is common for cryptographic keys such as 32-bits, 40-bits, 64-bits, 128-bits or 256-bits. Additionally, the numerical value of the bit sequence typically satisfies certain mathematical properties which may depend on the type of the cryptographic key (e.g., a symmetric key, a private key, a key which is based on a particular algorithm, etc.).

When the electronic apparatus 22 discovers a cryptographic key 34 in the source code 30, the electronic apparatus 22 performs a set of remedial operations 36 (i.e., one or more remedial operations 36). In some arrangements, the electronic apparatus 22 is equipped to perform a variety of different remedial operations 36 and selects one or more of the remedial operations 36 based on the type of cryptographic key 34 that is discovered in the source code 30. Such operations may involve alerting an administrator, deleting the cryptographic key 34 from the source code 30, replacing the cryptographic key 34 in the source code 30 (e.g., tokenizing the key 34, replacing the key 34 with a substitute key 34, etc.), blocking further movement or further processing of the source code 30, quarantining the source code 30, etc.

When the electronic apparatus 22 does not discover a cryptographic key 34 in the source code 30, the electronic apparatus 22 refrains from performing a remedial operation 36. In some arrangements (e.g., in the context of a software development platform), the electronic apparatus 22 may mark the source code 30 or add an entry to a log file to indicate that the source code 30 has been scanned and that no cryptographic keys 34 were detected.

In either situation, the electronic apparatus 22 may then perform other operations. For example, the electronic apparatus 22 may forward the source code 30 on to another device when the electronic apparatus 22 is a firewall or other data communications device. As another example, the electronic apparatus 22 may perform email message delivery operations when the electronic apparatus 22 is an email server, and so on. Further details will now be provided with reference to FIG. 2.

FIG. 2 shows certain details of the electronic apparatus 22 of the electronic environment 20. The electronic apparatus 22 includes a network interface 50, a user interface 52, a controller 54, and source code storage 56.

The network interface 50 connects the electronic apparatus 22 to the communications medium 26 (FIG. 1) and thus enables the electronic apparatus 22 to communicate with other devices of the electronic environment 20 (e.g., the client devices 24). In some arrangements, the network interface 50 is implemented in the form of a network card or a network adapter module.

The user interface 52 of the electronic apparatus 22 receives input from a user (e.g., an administrator who configures and manages the electronic apparatus 22) and provides output to the user. To this end, the user interface 52 includes a keyboard, a mouse, a display, and hardware/physical ports for other types of user communications (e.g., magnetic I/O, optical I/O, wireless I/O, etc.).

The controller 54 of the electronic apparatus 22 performs scanning operations 32 on the source code 30 and remedial operations 36 when the scanning operations 32 detect cryptographic keys 34 within the source code 30. In some arrangements, the controller 54 employs searching techniques similar to those of DLP technology and antivirus technology to detect the presence of cryptographic keys 34 within the source code 30.

Additionally, the controller 54 manages the source code storage 56. The particular way in which the controller 54 manages the source code storage 56 can be made application dependent. For example, if the electronic device 22 is a file server and if the source code storage 56 includes non-volatile memory such as magnetic disk drive devices, flash memory, etc., the controller 54 may store the source code 30 in one or more files (i.e., source code 30 at rest) within a file system. As another example, if the electronic device 22 is network component such as a firewall or an email server and if the source code storage 56 includes a cache (e.g., high speed semiconductor memory, a temporary storage buffer, etc.), the controller 54 may store the source code 30 as one or more temporarily buffered electronic communications (i.e., source code 30 en route between end point devices). As yet another example, if the electronic device 22 is a software development system and if the source code storage 56 includes a database, the controller 54 may store the source code 30 as one or more entries in a source code repository.

It should be understood that the controller 54 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 60 is capable of delivering all or portions of the software to the electronic apparatus 22. The computer program product 60 has a non-transitory (or non-volatile) computer readable medium which stores a set of instructions which controls one or more operations of the controller 54. Examples of suitable computer readable storage media include tangible articles of manufacture and apparatus which store instructions in a non-volatile manner such as CD-ROM, flash memory, disk memory, tape memory, and the like.

Further details for various remedial operations 36 will now be provided. It should be understood that the controller 54 is capable of performing more than one remedial operation 36 in response to discovery of a cryptographic key 34 within the source code 30. It should be further understood that the controller 54 can be configured to perform different remedial operations 36 depending on how the controller 54 discovers the cryptographic key 34 within the source code 30 (e.g., whether the controller 54 finds the cryptographic key 34 within source code 30 at rest vs. source code 30 en route between end point devices, etc.). Additionally, the controller 54 can be configured to perform different remedial operations 36 depending on user input or the intended use of the source code 30 following key detection (e.g., visual review, building a test version of an executable program, a commercial software release, etc.).

Alerting an Administrator

One remedial operation 36 involves the controller 54 providing an alert to a user (e.g., an administrator, an engineer/programmer, a manager, etc.). In some arrangements, the alert identifies the source code 30 (e.g., by filename, by file owner, etc.). In some arrangements, the alert includes a full copy of the source code 30 or a viewable portion of the source code 30 (e.g., a copy of an email message or other electronic communication having the source code 30 containing the cryptographic key 34, etc.).

The alert itself may take a variety of different forms. Such an alert may be a warning which is displayed on an electronic display (e.g., see the user interface 52 in FIG. 2). Such an alert also may be an email message or other electronic notification which is sent to a workstation of the user (e.g., see the client devices 24 in FIG. 1).

Upon receipt of the alert, the user is able to decide whether to allow the cryptographic key 34 to remain within the source code 30, or perhaps delete or overwrite the cryptographic key 34 to prevent further exposure. For example, the user may direct the controller 54 to electronically delete or replace the cryptographic key 34.

In some arrangements, the controller 54 automatically performs another remedial operation 36 in addition to providing the alert. For example, the controller 54 may block the user from checking in source code 30 with a hard coded cryptographic key 34 into a source code repository without special authorization. Similarly, the controller 54 may prevent the user from sending an email message containing source code 30 with a hard coded cryptographic key 34 either in the body of the email message or as an attachment without special authorization.

Intercepting and/or Deleting the Cryptographic Key

Another remedial operation 36 involves the controller 54 intercepting and/or deleting the cryptographic key 34 from the source code 30. In the context of intercepting source code 30 at rest (e.g., a source file) with a discovered cryptographic key 34, the controller 54 may quarantine the source file until an authorized user has reviewed the source code 30 and approved the source code 30 for further processing. In the context of intercepting source code 30 with a discovered cryptographic key 34 en route between end points (e.g., an email message or other electronic communication), the controller 54 may block further transmission of the source code 30 and buffer the source code 30 within the source code storage 56 (FIG. 2) until the authorized user has addressed the discovery. Until the authorized user allows further processing, the controller 54 may deny access to the source code 30 by other users, may prevent copying or removal of the source code 30 from the electronic apparatus 22, and so on.

In other arrangements, the controller 54 automatically deletes any discovered cryptographic keys 34 from the source code 30 and allows access to the redacted source code 30. For example, in the context of a source file, the controller 54 may excise the cryptographic key 34 from the source code 30 and then allow users to copy or remove the redacted source code 30 from the electronic apparatus 22. In the context of a network component, the controller 54 may forward the redacted source code 30 (e.g., an email message or other electronic transmission) so that the redacted source code 30 reaches the ultimate destination. In these arrangements, security is maintained since the cryptographic key 34 no longer exists within the source code 30.

Replacing the Cryptographic Key with a Token

Another remedial operation 36 involves the controller 54 replacing the cryptographic key 34 with a token. Here, the controller 54 overwrites the cryptographic key 34 within the source code 30 with a token value (e.g., a random number or random string of characters/symbols) and maintains a record of the original cryptographic key 34 with the intent of reinstating the cryptographic key 34 within the source code 30 at some future time.

Figure 3:
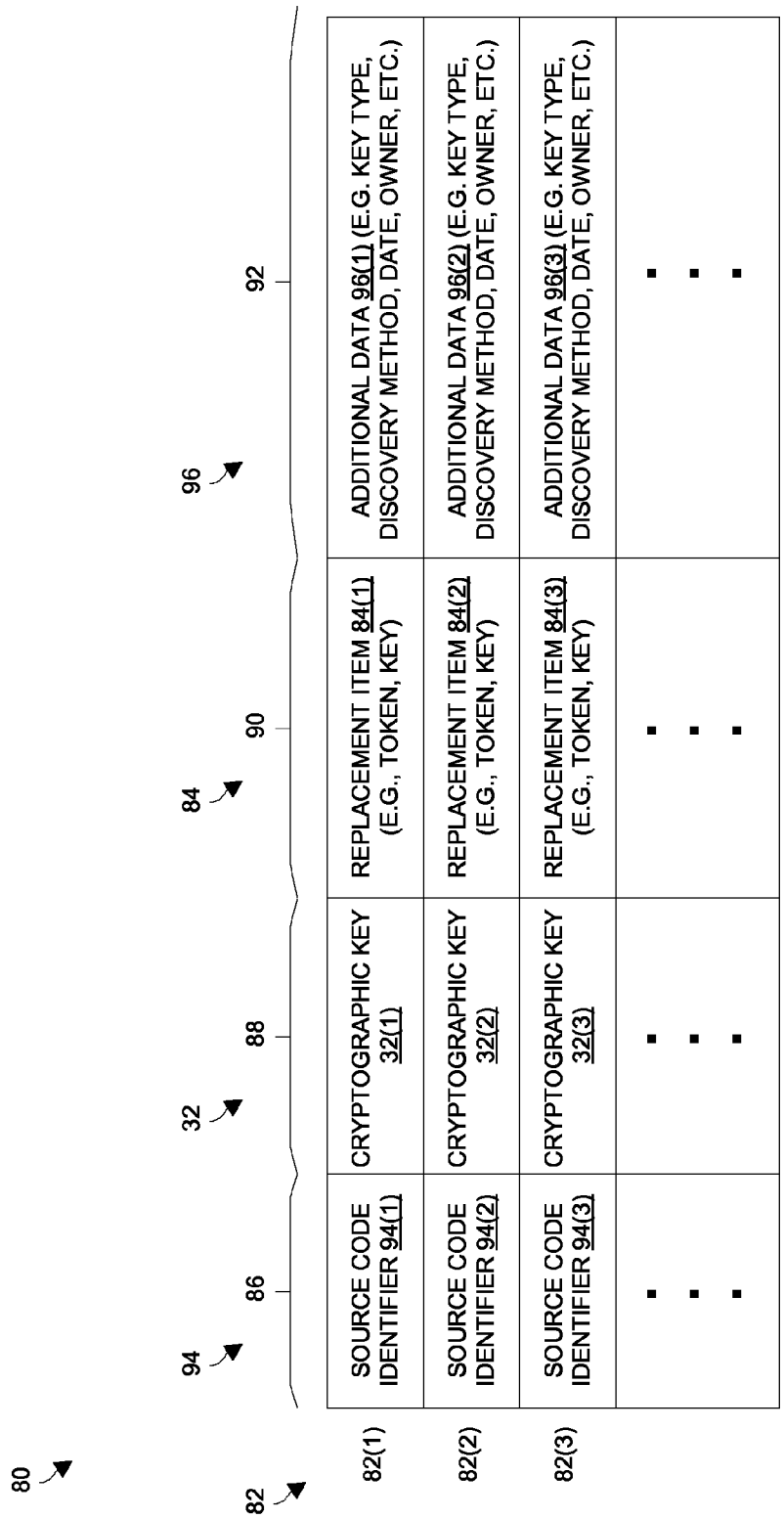
FIG. 3 is a block diagram of a tokenization database which is suitable for use by the apparatus of FIG. 2.

FIG. 3 shows a replacement database 80 which is suitable for use by the controller 54 when tokenizing cryptographic keys 34. The replacement database 80 includes entries 82 (i.e., rows in FIG. 3) which map replacement items 84 to the cryptographic keys 34. Each entry 82 includes a source code identifier field 86, a cryptographic key field 88, a replacement item (or element) field 90, and other fields 92.

For each entry 82, the source code identifier field 86 holds a source code identifier 94 which identifies particular source code 30 discovered to have contained a cryptographic key 34 but now which contains, as a replacement item 84, a token in place of the cryptographic key 34. Accordingly, the source code identifiers 94 can identify a file (e.g., pathname and filename), an email message, and so on.

For each entry 82, the cryptographic key field 88 holds the discovered cryptographic key 34 which has been removed from the source code 30 identified by that entry 82. Eventually, the cryptographic key 34 may be re-read from the replacement database 80 and reinstated within that source code 30.

For each entry 82, the replacement item field 90 holds the replacement item 84 which was used to replace the cryptographic key 34 in the source code 30 identified by that entry 82. In some arrangements, the replacement item 84 is a token in the form of a random number or random sequence of characters/symbols. In some arrangements, the replacement item 84 is an algorithmically derived token which includes some embedded identification information (e.g., a type of cryptographic key 34 that was replaced, a watermark for tracking purposes, etc.).

For each entry 82, the other fields 92 hold additional data 96 such as the type of cryptographic key 34 that was replaced, the method of key discovery, the date of discovery/replacement, an owner identifier, and so on. At some time in the future, if the controller 54 is instructed to restore a cryptographic key 34 in the source code 30 in place of a replacement item 84, the controller 54 updates additional data 86 of the appropriate entry 82 to indicate that the source code 30 is no longer tokenized.

Replacing the Original Cryptographic Key with a Substitute Key

Another remedial operation 36 involves the controller 54 replacing the original cryptographic key 34 with a substitute key. For this remedial operation 36, the controller 54 overwrites the cryptographic key 34 within the source code 30 with the substitute key in an attempt to preserve the functionality of the source code 30, but nevertheless prevent further exposure of the original cryptographic key 34.

It should be understood that the replacement database 80 of FIG. 3 is suitable for use by the controller 54 when substituting original cryptographic keys 34 with substitute keys. Along these lines, the replacement item field 90 of each entry 82 in the replacement database 80 holds a substitute key as its replacement item 84. In some arrangements each substitute key is of the identical type as the original cryptographic key 34 undergoing replacement (e.g., a symmetric key, a private key, etc.) thus enabling full functionality of any programs built using the source code 30 with the substitute key. To this end, it should be further understood that each type of cryptographic key 34 possesses certain mathematical properties, and that the controller 54 is equipped to derive the substitute keys to include the same mathematical properties.

Nevertheless, it should be understood that it is possible for the controller 54 to reinstate the original cryptographic key 34 in the source code 32 at a later time. In particular, in a manner similar to the earlier described tokenization remediation, the original cryptographic key 34 can be restored within the source code 30 in place of the substitute key. When the controller 54 restores the original cryptographic key 34 to the source code 30, the controller 54 updates additional data 86 of the additional fields 92 of the appropriate entry 82 to indicate that the source code 30 now has the original cryptographic key 34.

Replacing the Original Cryptographic Key with Code to Access a Secure Key Container Yet another remedial operation 36 involves the controller 54 replacing the original cryptographic key 34 with replacement code that accesses a secure key container. Examples such replacement code may include a function call, a macro and/or a code snippet. Hereinafter, such replacement code will be referred to generally as a function call but it is intended that this term cover other techniques (e.g., procedure calls, library calls, routines, macro substitutions, #-defines, insertions of programming instructions, etc.). In these situations, the controller 54 overwrites the cryptographic key 34 within the source code 30 with the function call and stores the cryptographic key 34 safely in the secure key container. Accordingly, the controller 54 effectively prevents further exposure of the cryptographic key 34.

An example of a secure key container is a restricted module or location in memory which is encrypted or protected under some alternative form of access control. A specific example of a secure key container is a function call to a tokenization module where the function call is compliant with a standard API such as PKCS#11.

Further Details

It should be understood that the above-described scanning and remedial operations can be applied to enhance or augment a software development platform. For example, in some situations, it may be advantageous to allow access to the source code 30 simply for review purposes, and thus deletion of the cryptographic key 34 or replacement of the cryptographic key 34 with a token is sufficient. In other situations, it may be advantageous to enable conversion of the source code 30 into an executable program for testing purposes, and therefore replacement of the original cryptographic key 34 with a substitute key of the same type as the original cryptographic key 34 is sufficient. In yet other situations, it may be advantageous to allow access to the source code 30 with the original cryptographic key 34 such as when the source code 30 needs to be reviewed in its fullest form by a chief engineer.

Figure 4:
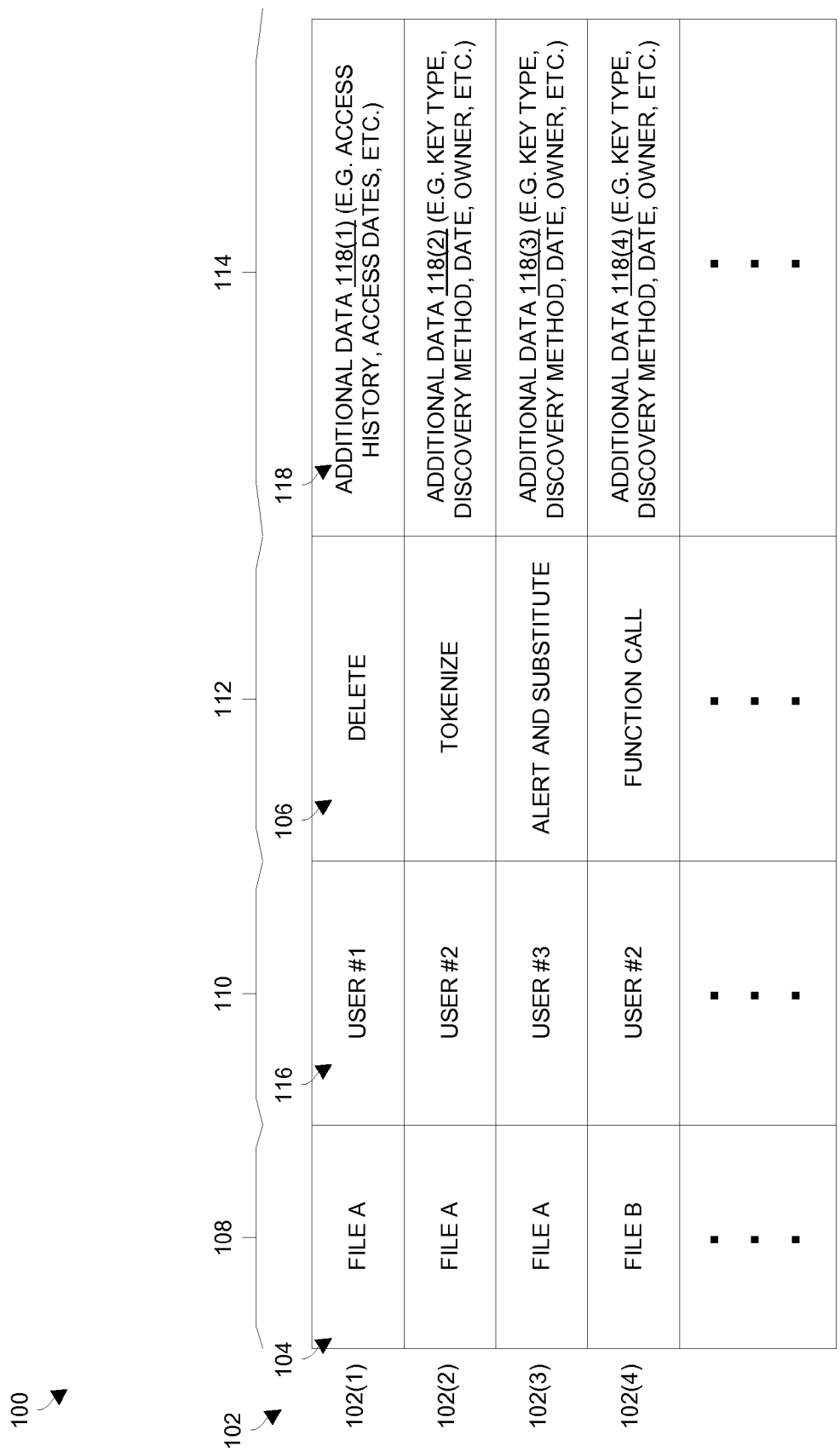
FIG. 4 is a block diagram of an access table which is suitable for use by the apparatus of FIG. 2.

FIG. 4 shows an access table 100 which is suitable for selecting which remedial operation or operations 36 to perform in response to a request for particular source code 30. The access table 100 includes entries 102 which map user identifiers 104 to identifiers 106 of remedial operations 36. Each entry 102 of the access table 100 (i.e., a row in FIG. 4) includes a source code identifier field 108, a user identifier field 110, a remedial operation field 112, and other fields 114.

The source code identifier field 108 of each entry 102 holds a source code identifier 104 which identifies particular source code 30 discovered to have contained a cryptographic key 34. In some arrangements, the controller 54 is tightly integrated with the control circuit which manages source code within the software development platform and the source code identifiers utilized by the software development platform are also used as the source code identifiers 104. In other arrangements such as a file system, the controller 54 uses a different type of identifier to identify the source code such as absolute pathnames and filenames.

The user identifier field 110 of each entry 102 holds a user identifier 116 which identifies a particular user or client device 24 (also see FIG. 1). In some arrangements, the controller 54 is constructed and arranged to perform a default set of remedial operations 36 if the controller 54 does not find a particular user or client device 24 listed for particular source code 30 in the access table 100.

The remedial operation field 112 of each entry 102 holds control settings which indicate which remedial operations 36 to perform based on the particular source code 30 and the particular user. These control settings are essentially identifiers 106 of remedial operations 36 that should be performed if the specified user requests access to the source code 30. Accordingly, when the controller 54 receives a request to access particular source code 30 from a user, the controller 54 simply looks through the entries 102 to find an entry 102 with a matching user identifier 116 and source code identifier 104, and then performs the set of remedial operations 36 specified by the remedial operation identifiers 106.

The other fields 112 hold additional data 118 such as access history, access dates and times, etc. Accordingly, the access table 100 is able to track the status of the source code 30 containing cryptographic keys 34. Further details will now be provided with reference to FIG. 5.

Figure 5:
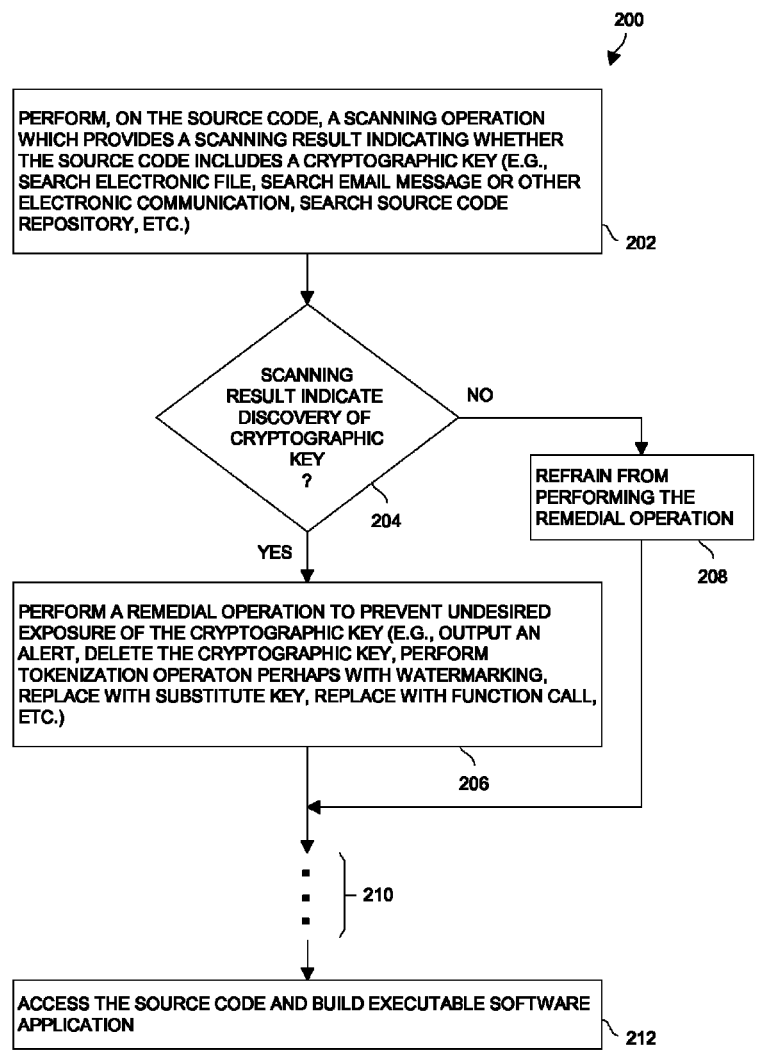
FIG. 5 is a flowchart of a procedure which is performed by the apparatus of FIG. 2.

FIG. 5 shows a flowchart of a procedure 200 which is performed by the electronic apparatus 22 when protecting against cryptographic key exposure within source code 30. In step 202, the electronic apparatus 22 performs a scanning operation 32 on the source code 30 and provides a scanning result indicating whether the source code 30 includes a cryptographic key 34.

In step 204, the electronic apparatus 22 takes different operational paths depending on the scanning result. In particular, if the scanning result indicates that a cryptographic key 34 exists in the source code 32, step 204 proceeds to step 206. However, if the scanning result indicates that a cryptographic key 34 does not exist in the source code 32, step 204 proceeds to step 208.

In step 206, when the scanning result indicates that the source code 30 includes a cryptographic key 34, the electronic apparatus 22 performs a remedial operation 36 to prevent undesired exposure of the cryptographic key 34. Examples of various remedial operations 36 include providing an alert, deleting the cryptographic key 34 from the source code 30, replacing the cryptographic key 34 with a token perhaps with watermarking, replacing the cryptographic key 34 with a substitute key, and inserting a function call (or code) into the source code 30 to alleviate the need for the cryptographic key 34, among other things.

In step 208, when the scanning result indicates that the source code does not include a cryptographic key 34, the electronic apparatus 22 refrains from performing any remedial operation 36. As a result, the source code 30 is readily accessible.

It should be understood that following steps 206 and 208, other steps can be performed. Along these lines, the electronic apparatus 22 may make the source code 30 available to others for reviewing, for testing, and so on.

At some point and as illustrated in step 212, the electronic apparatus 22 builds an executable software application using the source code 30. The executable software application is capable of running on a computerized device.

As described above, improved techniques involve protecting source code 30 by scanning the source code 30 for cryptographic keys 34 using an electronic tool. For example, such scanning can be performed in a manner similar to that of a data loss prevention (DLP) tool which filters data for sensitive information such as credit card numbers, social security numbers, and so on. If the results of such scanning uncovers a cryptographic key 34 within the source code 30, the electronic tool can be configured to automatically take remedial action (e.g., alert an administrator, delete the key, replace the key, combinations thereof, etc.). As a result, further undesired exposure of the cryptographic key 34 is prevented.

While various embodiments of the invention have been particularly shown and described, it will be understood by those skilled in the art that various changes in form and details may be made therein without departing from the spirit and scope of the invention as defined by the appended claims.

For example, it should be understood that a particular implementation was described above in the context of protection of source code in a software development process. In particular, data loss prevention and tokenization technologies were applied to identify noncompliant uses of cryptographic keys 32. It should be understood that such techniques may also be readily applied to identify similar uses in network traffic, email, and other scenarios, and that such applications belong to various embodiments.

In these and other embodiments, a controller 54 (FIG. 2) scans source code 30 looking for cryptographic keys 32. When the controller 54 finds a cryptographic key 32, the controller 54 chooses one or more remedial operations 36:
1. alert an administrator or an engineer
2. intercept and delete the key
3. replace the key with a token
4. automatically generate a new key to replace the intercepted key
5. replace existing code with other code designed to access a secure key container, such as PKCS#11.

It may be readily seen that a variety of useful variations are possible. For instance, for item 1 above, the controller 54 can scan source code 30 at rest on disk. As an alternative, the controller 54 can scan at a network boundary, such as at a firewall. In addition, the controller 54 can be used to scan a computer's RAM and disk space, especially when embodied in a virtual machine that may be stored on disk. Similarly, the controller 54 can scan alternative channels such as email messages to detect cryptographic keys 34.

As another alternative, various aspects can be integrated with a source code repository tool. In these situations, the controller 54 can perform automatic scanning whenever source code 30 is checked in or out. As yet another alternative, the controller 54 can perform automatic scanning when source code 30 is backed up.

In addition, item 1 above can detect possible cryptographic keys 32 by checking the entropy of a stream of data. Along these lines, some approaches that are well known in the literature include Huffman encoding, or data compression using the well-known zip algorithm. Because cryptographic keys 32 may be random, these approaches are unable to compress cryptographic keys 32.

In connection with item 5 above, tokenization can be used in conjunction with an internal replacement database 80 (or even an external tokenization server). In these situations, the controller 54 copies the cryptographic key 32 to the replacement database 80 (or the tokenization server), which in turn replies with a token. The controller 54 modifies the source code 30 by replacing the cryptographic key 32 with the token. In some arrangements, the token is simply be a random number that can be used in the same way the original cryptographic key 32 was used for purposes of testing. That is, for purposes of development and testing, the source code 30 uses the token in place of the actual cryptographic key 32.

As a further embodiment, some cryptographic keys 32 have specific mathematical properties. In contrast to a symmetric key system, the private key of a public-private key pair must meet certain mathematical criteria in order to function as a drop-in replacement for the tokenized key. For example, in accordance with one conventional encryption algorithm, the public key (e), private key (d), and composite modulus (n) are related by a mathematical formula: $d = e^{-1} \bmod \varphi(n)$. In this situation, the controller 54 uses this mathematical structure to detect the type of key pair so that the controller 54 can automatically replace it with a functional equivalent if detected.

It should be understood that the controller 54 can perform some simple efficient tests to determine what type of cryptographic key 32 is present. For example, if a source file contains two or three random strings of data that are of length commonly used in a cryptographic algorithm, such as 1024 bits, 2048 bits, etc., these values could be plugged into the mathematical formula above to see if the relation holds. Additionally, the controller 54 can test these long random strings of data for primality. In the above-mentioned algorithm, the composite modulus is by definition not a prime. Finding a source file that contains a long composite number suggests that the controller 54 has found a key pair. Once done, this key pair could be replaced by a token key pair used only for testing.

By contrast, in the well-known Diffie Hellman key agreement scheme, operations are carried out modulo a long prime. Therefore, detecting a long prime suggests that the controller 54 has found a Diffie Hellman key pair. Once done, this Diffie Hellman key pair could be replaced by a token key pair used only for testing.

Similar checks may be carried out for elliptic curve cryptography. Random looking parameters may be tested to see if they satisfy a mathematical relation on either one of the curves commonly used in ECC, such as the so-called NIST curves; or on a curve explicitly specified in the source code. As above, the ECC key pair could be replaced by a token key pair used only for testing.

Turning now to symmetric cryptography, most uses of well-known algorithms like DES and AES for encryption; MD5, SHA-1, and SHA-256 for hashing may be identified by collections of constants. Efficient software implementations of DES and AES rely on lookup tables consisting of fixed data values. These values are the same for all implementations and do not vary based on the cryptographic key 32. Similarly, the hashing algorithms use a fixed initialization vector for all implementations. In this way, the controller 54 can detect the mere usage of a cryptographic algorithm. Upon finding such a usage, the controller 54 can alert an administrator if a blacklisted algorithm is used. For example, MD5 is generally considered to be weak. The controller 54 can automatically detect its usage and emit an alert. Once algorithm-usage is detected, the controller 54 can scan for the use of revoked, or blacklisted cryptographic keys 32.

As a further embodiment of item 6 above, a release engineering organization could use the controller 54 to perform "just in time tokenization." In this approach, when a developer or quality assurance engineer check code out from a repository, they are given a token key instead of the cryptographic key 32. By contrast, release engineering would be given the actual cryptographic key 32 for release. In summary, the controller 54 could perform tokenization based on certain access controls. That is, the tool would automatically tokenized source code 30 checked out by any developer except for those on a special list (e.g., see FIG. 4). This access control list may further specify user authentication methods, such as the well-known SecurID system offered by RSA a division of EMC Corporation of Hopkinton, Mass. In this way, only certain authenticated individuals would be given access to an actual cryptographic key 32.

As an additional embodiment, the scanning in item 1 can be applied to a test environment for a runtime system. Test keys could be used in this environment with the intention of rotating these keys for production. The controller 54 can scan the source code 30 to ensure that no test keys are deployed in production. Similarly, the controller 54 can locate other revoked or blacklisted keys either in source or production to make sure those keys are no longer in current use.

A similar approach could be used to improve the security of deployed applications. Cryptographic keys 32 which are hard coded into the application binaries could be detected and alerted (so the company can contact the OEM for remediation) and/or so that the keys can be replaced in the product. Such modifications and enhancements are intended to belong to various embodiments.

What is claimed is:

1. In an electronic device, a method of protecting source code, the method comprising:

performing, on the source code, a scanning operation which provides a scanning result indicating whether the source code includes a cryptographic key;

when the scanning result indicates that the source code includes a cryptographic key, performing a remedial operation to prevent undesired exposure of the cryptographic key; and when the scanning result indicates that the source code does not include a cryptographic key, refraining from performing the remedial operation;

wherein the source code belongs to a particular software component of a set of software components; and wherein the method further comprises after performing the scanning operation, building a software application from the set of software components; and wherein performing the remedial operation to prevent undesired exposure of the cryptographic key includes:
identifying a location within the source code to insert a function call to a routine which obtains a substitute key from a substitute key source;
inserting, at the identified location within the source code, the function call to the routine which obtains the substitute key from the substitute key source; and
removing the cryptographic key from the source code.

2. A method as in claim 1 wherein the electronic device includes a controller and a storage device; wherein the source code resides within an electronic file stored in the storage device; and wherein performing the scanning operation includes:
searching, by the controller, the electronic file stored in the storage device for a cryptographic key, the scanning result having a first value when the electronic file is discovered to contain a cryptographic key and a second value when the electronic file is discovered not to contain a cryptographic key, the first value being different than the second value.

3. A method as in claim 1 wherein the electronic device includes a firewall; wherein the source code resides within an electronic communication processed by the firewall; and wherein performing the scanning operation includes:
searching, by the firewall, the electronic communication for a cryptographic key, the scanning result having a first value when the electronic communication is discovered to contain a cryptographic key and a second value which is different than the first value when the electronic communication is discovered not to contain a cryptographic key.

4. A method as in claim 1 wherein the electronic device includes an email circuit; wherein the source code resides within an email message; and wherein performing the scanning operation includes:
searching, by the email circuit, the email message for a cryptographic key, the scanning result having a first value when the email message is discovered to contain a cryptographic key and a second value which is different than the first value when the email message is discovered not to contain a cryptographic key.

5. A method as in claim 1 wherein the electronic device includes a software development platform having a source code management circuit and a source code repository; wherein the source code resides in a source file stored in the source code repository; and wherein performing the scanning operation includes:
searching, by the source code management circuit of the software development platform, the source file for a cryptographic key, the scanning result having a first value when the source file is discovered to contain a cryptographic key and a second value which is different than the first value when the source file is discovered not to contain a cryptographic key.

6. A method as in claim 1 wherein performing the remedial operation to prevent undesired exposure of the cryptographic key further comprising:
outputting an alert message to an electronic display to indicate discovery of the cryptographic key within the source code.

7. A method as in claim 1 wherein performing the remedial operation to prevent undesired exposure of the cryptographic key further comprising:
deleting the cryptographic key from the source code to prevent further exposure of the cryptographic key.

8. A method as in claim 1 wherein performing the remedial operation to prevent undesired exposure of the cryptographic key further comprising:
assigning a token to the said substitute cryptographic key;
replacing the said substitute cryptographic key within the source code with the token; and
adding an entry into a database, the entry matching the token to the said substitute cryptographic key.

9. A method as in claim 8, further comprising:
performing a restoration operation which (i) queries the database for the entry which matches the token to the said substitute cryptographic key and (ii) in response to querying the database for the entry, replaces the token within the source code with the said substitute cryptographic key to restore the cryptographic key within the source code.

10. A method as in claim 1 wherein performing the remedial operation to prevent undesired exposure of the cryptographic key further comprising:
adding an entry into a database, the entry matching the substitute key to the cryptographic key.

11. A method as in claim 10 wherein performing the remedial operation to prevent undesired exposure of the cryptographic key further comprising:
performing a key analysis operation to select, from a set of key types, a particular key type of the cryptographic key, each of the key types corresponding to a respective mathematical property; and
providing, as the substitute key, a cryptographic parameter which satisfies the respective mathematical property corresponding to the particular key type selected from the set of key types.

12. A method as in claim 1 wherein the substitute key source is a secure key container; and wherein inserting the function call includes:
providing a set of instructions which, when performed by a computerized device, cause the computerized device to obtain the substitute key from the secure key container.

13. A method as in claim 1, further comprising:
prior to building the software application, receiving a source code request from a user, the source code request including (i) a component identifier which identifies the particular software component among the set of software components and (ii) a user identifier which identifies the user among a set of users; and
providing the user with a checked out form of the particular software component in response to the source code request, the checked out form of the particular software component including (i) a first version of the cryptographic key when the user identifier resides on a user list and (ii) a second version of the cryptographic key when the user identifier does not reside on the user list, the first version being different from the second version.

14. A method as in claim 1 wherein performing the scanning operation includes:
discovering a cryptographic sequence of symbols within the source code; and
performing a watermark detection operation on the cryptographic sequence of symbols, an output of the watermark detection operation having a first value when the cryptographic sequence of symbols is an actual cryptographic key, and the output of the watermark detection operation having a second value when the cryptographic sequence of symbols is a token, the first value being different than the second value.

15. An electronic apparatus to protect source code, the electronic apparatus comprising:
a source code source; and
a controller coupled to the source code source, the controller being constructed and arranged to:
obtain source code from the source code source,
perform, on the source code, a scanning operation which provides a scanning result indicating whether the source code includes a cryptographic key,
when the scanning result indicates that the source code includes a cryptographic key, perform a remedial operation to prevent undesired exposure of the cryptographic key, and
when the scanning result indicates that the source code does not include a cryptographic key, refrain from performing the remedial operation;
wherein the source code belongs to a particular software component of a set of software components residing within the source code source; and wherein the controller is further constructed and arranged to:
after performing the scanning operation, build a software application from the set of software components residing within the source code source;
wherein performing the remedial operation to prevent undesired exposure of the cryptographic key includes:
identify a location within the source code to insert a function call to a routine which obtains a substitute key from a substitute key source;
insert, at the identified location within the source code, the function call to the routine which obtains the substitute key from the substitute key source; and
remove the cryptographic key from the source code.

16. A computer program product which includes a non-transitory computer readable medium storing a set of instructions which, when performed by a computerized device, cause the computerized device to:
perform, on source code, a scanning operation which provides a scanning result indicating whether the source code includes a cryptographic key;
when the scanning result indicates that the source code includes a cryptographic key, performing a remedial operation to prevent undesired exposure of the cryptographic key; and
when the scanning result indicates that the source code does not include a cryptographic key, refraining from performing the remedial operation;
wherein the source code belongs to a particular software component of a set of software components; and wherein the set of instructions further cause the computerized device to:
after the computerized device performs the scanning operation, build a software application from the set of software components;
wherein performing the remedial operation to prevent undesired exposure of the cryptographic key includes:

identify a location within the source code to insert a function call to a routine which obtains a substitute key from a substitute key source;

insert, at the identified location within the source code, the function call to the routine which obtains the substitute key from the substitute key source; and remove the cryptographic key from the source code.

\* \* \* \* \*